May 12, 1936.  A. ROTHSCHMITT  2,040,761
SPHERICAL BORING HEAD
Filed July 20, 1933

INVENTOR
ANTON ROTHSCHMITT
BY J. William Carson
ATTORNEY

Patented May 12, 1936

2,040,761

UNITED STATES PATENT OFFICE 2,040,761

SPHERICAL BORING HEAD

Anton Rothschmitt, Irvington, N. J., assignor to Walter Kidde & Company, Inc., Bloomfield, N. J., a corporation of New York Application July 20, 1933, Serial No. 681,291

4 Claims. (Cl. 77—58)

The present invention relates in general to the manufacture of cylinders or containers for the transportation and storage of fluids under high pressure, and embodies, more specifically, an improved method of and apparatus for manufacturing an improved light weight cylinder, the construction affording great strength for a minimum weight of the cylinder.

It has long been realized that gas, such as carbonic acid gas, compressed under great pressure, has great potential advantages for airplane purposes, particularly for flotation if the plane descends upon water, for motor starting, and for fire extinguishing.

The practical use of such gas in connection with airplanes has been made possible by the provision of a light weight cylinder machined both externally and internally to a desired predetermined thickness and minimum weight, it having previously been considered necessary that the cylinders have great weight in order to withstand the great internal pressure and to comply with the previously existing regulations of the Interstate Commerce Commission.

However, in the method of producing light weight cylinders from a tube, which may either be opn at both ends or closed at one end and open at the other, comprising machining the tube internally and externally to a predetermined thickness and necking-in an open end of the tube to provide a neck for the reception of a valve or plug or the like, the necking-in operation has resulted in an undue thickness of the cylinder in the shoulder portion adjacent the neck, the metal on the internal surface of the shoulder adjacent the neck of the cylinder being of poor quality and being in any event superfluous, as the strength of the cylinder at this point is otherwise sufficient without this additional metal.

It is accordingly an object of the present invention to provide a light weight cylinder for the transportation and storage of fluids under high pressure, said cylinder having a minimum of weight for any required strength.

It is a more specific object of the present invention to provide a light weight cylinder, of the type having at least one end necked-in to receive a valve or plug or the like, in which a minimum wall thickness in the shoulder of the cylinder adjacent a necked-in end is provided.

It is a further object of the invention to provide a method of manufacturing a light weight cylinder with a minimum wall thickness in the shoulder portion adjacent the necked-in end, comprising machining the external surface of the shoulder to a predetermined curvature and machining the internal surface of the shoulder to a predetermined curvature, employing the external surface of the shoulder as the controlling gaging surface for the internal surface machining tool.

It is a further object of the invention to provide an inside surface machining tool for machining the inside surface of a high pressure gas container adjacent a neck end thereof after the container has been necked-in.

Another object is to provide an inside surface machining tool for machining the inside surface of any hollow object, having an opening disposed axially of the inside surface to be machined, adjacent the axially disposed opening.

Still another object is to provide an inside surface machining tool for machining any portion of the inside surface of any hollow object having an opening disposed in an axial relation to the inside surface to be machined.

A further object of the invention is to provide an inside surface machining tool for machining the inside surface of a hollow object having an opening therethrough, comprising a supporting member adapted to be inserted through the opening and a machining tool movably mounted on the supporting member and arranged to describe an arc of any desired curvature.

A still further object of the invention is to provide an inside surface machining tool for machining the inside surface of a hollow object having an opening therethrough, comprising a supporting member adapted to be inserted through the opening and a machining tool pivotally carried by the supporting member and adapted to be rotated on its pivot to any desired radial position.

These and other objects of the invention will become apparent as the invention is described in greater detail in connection with the accompanying drawing wherein:

Figure 2 is an external view corresponding to Figure 1 with a portion broken away and in cross-section to show an intermediate position of the machining tool.

Figure 1:
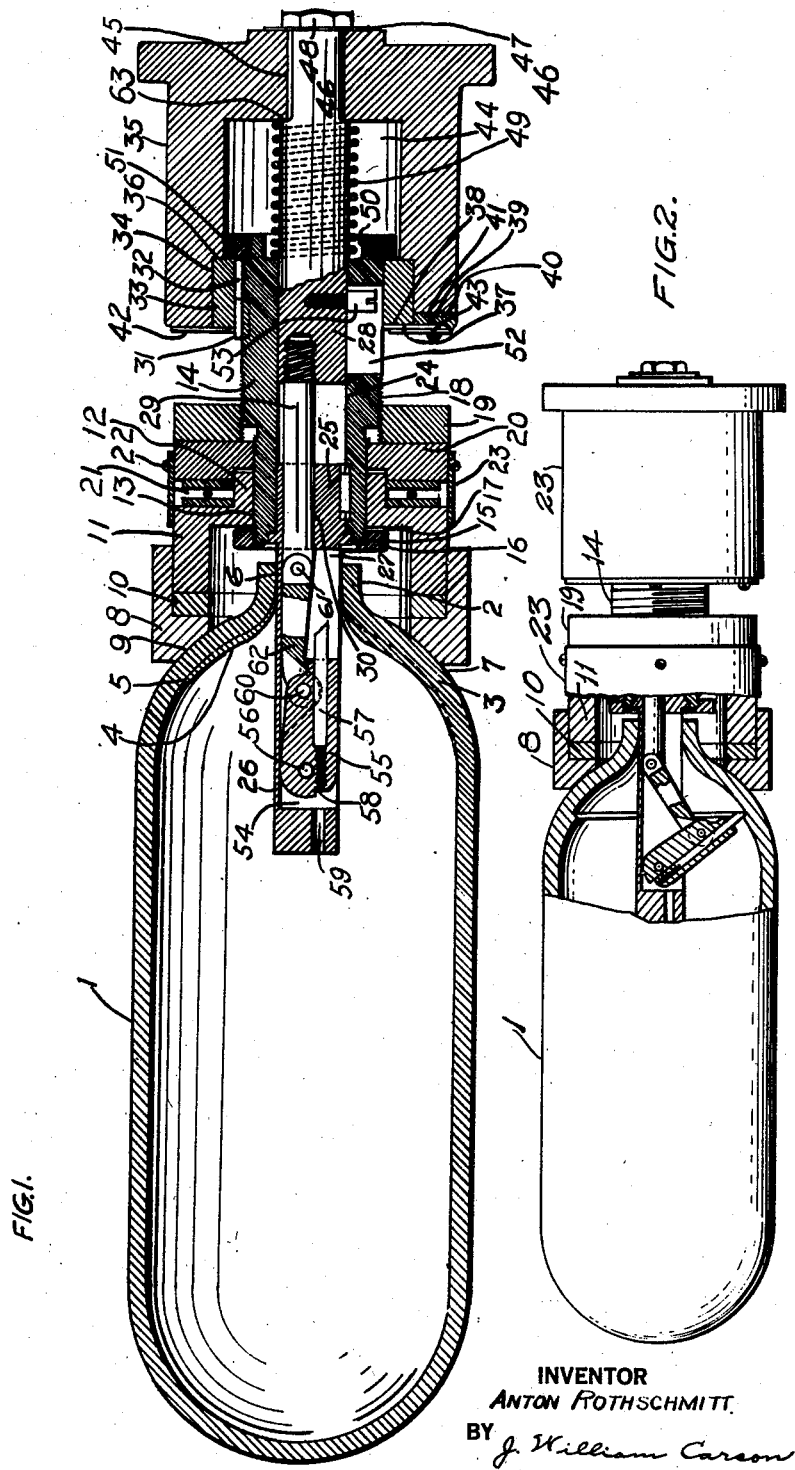
Figure 1 is a longitudinal cross-sectional view through a high pressure cylinder in accordance with the invention with an inside surface machining tool, likewise according to the invention, for machining the inside surface of the cylinder adjacent the neck end, shown in the position to start its machining operation.

Referring first of all to Figure 1 the reference numeral 1 represents a cylinder or container for fluids under high pressure, which may be a light weight cylinder or container made by any suitable method, such as cupping a blank by successive drawing operations to form a cylinder closed at one end, machining the cylinder internally and externally to a predetermined wall thickness, and necking-in the open end of the cylinder to form a neck end 2 and a shoulder portion 3.

When a container is formed in this manner by necking-in the open end of a tube, the better metal in the shoulder portion 3 is formed on the external surface of the shoulder, which is subjected to a swaging, hammering, or equivalent operation for effecting the required necking-in. The metal on the internal surface of the shoulder, being insufficiently worked and being appreciably deformed during the necking-in operation, is of poorer quality than the outer metal and is, in any event, superfluous, as the strength of the container at this point is otherwise sufficient without this additional metal.

Therefore, in accordance with the present invention, the metal shown at 4 on the interior surface of the shoulder 3 is machined away, for example, back as far as the dash line 5, shown within the cross-section of the shoulder portion 3.

It will, of course, be at once apparent that special equipment is necessary for accomplishing this internal machining operation, and the present invention not only includes a special tool for accomplishing this machining operation, but likewise includes a method of preparing a container for receiving the machining tool and for obtaining an exactly predetermined wall thickness of the shoulder 3 of the container.

The method of the present invention comprises boring the neck end 2 to an accurate predetermined diameter, as shown at 6, for receiving and guiding the inside surface machining tool, and machining, by means of any suitable tool not necessary to be shown here, the external surface 7 of the shoulder portion 3 to a fixed predetermined curvature or contour, so that the external surface 7 may be employed as an indexing surface for controlling the machining operation of the inside surface machining tool and for enabling the latter to machine the shoulder portion to an exactly predetermined wall thickness.

It is of course to be understood that, for effecting the desired machining of the internal surface of the shoulder of the container, the container is mounted on a lathe having a suitable head-stock and suitable means for guiding the container to cause it to run true. The tail-stock and the tool for machining the inside surface of the shoulder are, however, peculiar to the present invention, and their construction will now be described.

The reference numeral 8 represents a guide collar, shaped at 9 to conform to the curvature of the external surface 7 of the shoulder portion 3 of the container, and adapted to receive a spacer ring 10 and a coupling member 11. The coupling member 11 is provided with a hub 12 which is bored at 13 to receive with a close running fit a bushing 14. The bushing 14 is provided with screw-threads 15 which cooperate with corresponding screw-threads on a ring nut 16, which serves to prevent the bushing 14 from being accidentally withdrawn from the coupling member 11, there being normally a clearance at 17 between the ring nut 16 and the coupling member 11.

The bushing 14 is also provided with screw-threads 18 which engage cooperating screw-threads on a micrometer adjusting nut 19, which bears against a thrust ring 20, between which and the coupling member 11 there is provided a ball thrust bearing 21. Secured to the thrust ring 20 by means of screws 22 is a shield 23 for protecting the ball thrust bearing from dust and dirt.

The bushing 14 is bored at 24 to receive with a press fit the supported end 25 of a boring bar 26, which is adapted to be passed with a close-working fit through the bore 6 of the container. The boring bar 26 may also be keyed to the bushing 14 as shown. The boring bar 26 is provided with a flange 27 adapted to seat within a bored out portion of the bushing 14.

The other end of the bore 24 of the bushing 14 is adapted to receive with a sliding fit the push rod 28, to which is connected the push rod extension 29, which in turn passes through a bore 30 of the boring bar 26.

The bushing 14 is provided with a keyway adapted to receive a key 31, which in turn is adapted to slide within a keyway 32 in a sleeve 33, the arrangement preventing any rotary movement between the bushing 14 and sleeve 33, but permitting longitudinal movement therebetween. The sleeve 33 is received within a bored out portion 34 of an adapter 35, seating on a shoulder 36 within the adapter 35.

In order to prevent any rotary movement between the adapter 35 and the sleeve 33, there is provided a "fuse" pin 37 adapted to be received within a slot 38 in the sleeve 33 and in a slot 39 in a shearing block 40, which preferably is of hardened steel and is in the form of an insert within a slotted portion 41 of the adapter 35. The "fuse" pin 37 is retained within the slots 38 and 39 by a ring-shaped cover plate 42, which is secured to the face of the adapter 35 by screws 43, and which also serves to retain the sleeve 33 within the bore 34 of the adapter 35. It will be noted that the "fuse" pin 37 is the only means of connection between the sleeve 33 and the adapter 35, and the "fuse" pin 37 is made comparatively weak, so that if the machining tool, still to be described, should jam during the machining operation, the pin 37 will give way and permit rotary movement between the sleeve 33 and the adapter 35, thus preventing injury to the machining tool and its assembly. The reason for the need of the pin 37 will be better understood when the method of operation of the machining tool has been fully described.

The adapter 35 is chambered at 44 and is bored at 45 to receive with a relatively loose fit the extension 46 on the push rod 28, there being also provided a washer 47 and a nut 48 secured to the extension 46. A compression spring 49 encircles the push rod 28 and bears at one end within a bored out portion 50 of the bushing 14 and at the other end on a wall of the chamber 44 of the adapter 35. The assembly at this point is completed by a ring nut 51 having a screw-threaded engagement with the reduced end portion of the bushing 14 within the chamber 44 of the adapter 35.

The bushing 14 is also provided with a key slot 52 adapted to receive the head of a screw 53 mounted on the push rod 28, the screw 53 cooperating with the key slot 52 for the purpose of preventing rotary movement of the push rod 28.

Referring once again to the boring bar 26 which is recessed at 54, there is mounted within the recess 54 a tool holding member 55, the tool holding member being pivotally mounted on a pin 56 carried by the boring bar 26. The tool holding member 55 is suitably chambered to receive a tool bit 57, which may be secured within the tool holding member 55 in any suitable manner, a backing screw 58 being provided to support the tool bit against inward movement during the machining operation. The backing screw 58 may be reached for adjustment by the insertion of a suitable tool through the passage 59 in the end of the boring bar 26. Pivotally mounted on the pins 60 and 61 is the link 62, which serves to connect the push rod extension 29 and the tool holding member 55.

In employing the tool as above described for machining the inside surface of the shoulder of a high pressure gas container, the adapter 35 is preferably secured upon the turret of the lathe, and the container itself is suitably prepared and mounted in the manner already described, the surface 9 of the guide collar 8 being brought into engagement with the external surface of the shoulder of the container, the boring bar 26, of course, being inserted through the bore 6 of the container. Just before doing this, however, the tool bit 57 is carefully mounted within the tool holding member 55 so that the cutting edge of the tool is the required predetermined distance from the center of the pivot 56 so that it will describe the desired radius, not exceeding the internal radius of the cylindrical portion of the container. After the tool and the container have been assembled in the manner already described, the micrometer adjusting nut 19 is rotated in a direction to permit the tool to take a cut of the required amount off the inside surface of the shoulder of the container. The turret of the lathe is then caused to be advanced toward the container at the required rate of speed, carrying with it the push rod 28 and the push rod extension 29, by reason of the engagement of the adapter 35 with the shoulder 63 on the push rod 28 and causing the connecting link 62 to rotate the tool holding member 55 on its pivot 56, so that the cutting edge of the tool 57 moves radially outwardly from the recess 54 in the boring bar 26, advancing over the inside surface of the shoulder of the container all during the time that the container is revolved from the head-stock of the lathe. Assuming that the material to be removed is more than can be taken in one cut, as soon as one cutting operation has been completed, the cutting tool is returned to its original position within the recess 54 under the influence of the compression spring 49, by backing off the lathe turret, and the micrometer adjusting nut 19 is further adjusted to take another cut, the adjusting nut 19 being turned in the direction for moving the cutting tool closer to the inside surface to be machined.

By always machining the external surface of the shoulder 3 of the containers of a given size to a predetermined curvature or contour and by forming the surface 9 of the guide collar 8 to conform to the external surface of the shoulder 3, it is possible to determine how much the micrometer adjusting nut 19 must be rotated in order to cut the required amount of material from the inside surface of the shoulder, and after the required amount of turning of the micrometer adjusting nut 19 has been determined, it is possible to machine the wall thickness of the shoulder to a predetermined thickness of great accuracy without constant checking of the thickness of the shoulder; although of course the thickness of the shoulder should be checked when the machining operation has been completed.

A detailed description of Figure 2 of the drawing is not believed to be necessary, as this figure simply shows an external view corresponding to Figure 1 with a portion broken away and in cross-section to show an intermediate position of the machining tool.

In connection with the general operation of machining, it should be noted that the container and that portion of the tool assembly which is to the left of the ball thrust bearing rotate, and that that portion of the tool assembly which is to the right of the ball thrust bearing does not rotate, being secured as it is to the turret of the lathe. If, therefore, the machining tool should become jammed while the container is revolving, it is desirable to guard the tool against damage, and for this reason there is provided the comparatively weak "fuse" pin 37, which gives way in the manner previously described when any undue strain is placed upon the machining tool.

It should also be noted that the invention is equally applicable to fluid containers closed on one end and necked-in on the other end and to fluid containers necked-in on both ends; and is, in fact, applicable to effecting machining of the inside surface of any hollow object having an opening therethrough through which a machining tool may be inserted and manipulated; being further applicable to machining the side wall, the bottom wall or the shoulder of such containers or other hollow objects.

It will of course be apparent that, while the invention has been described with reference to one specific form of construction of the machining tool assembly, the latter may be carried out in other equivalent forms of construction, so long as the machining tool may be inserted into the interior of the object to be machined, and so long as it can be moved to describe an arc of any desired curvature whether circular or otherwise.

From the above description of both the method and one specific embodiment of the apparatus of the present invention, it will be apparent that I have made broadly new and useful improvements in the manufacture of light weight cylinders or containers, and it will accordingly be understood that I do not wish my invention to be limited save as defined in the appended claims.

I claim:

1. A spherical boring head comprising a guide collar, an adapter member, a hub with a reduced bore associated with said guide collar, an elongated bushing formed at one end for a close running fit within the reduced bore of said hub, the other end of the bushing being received within a bore of the adapter member, means to prevent relative rotation between said bushing and said adapter member, a boring bar carried by the bushing and secured against translation and rotation with respect thereto, a machining tool holder pivotally carried by the boring bar and normally lying within a recess thereof, a push rod mounted for longitudinal movement within the bushing and attached to the adapter member, a push rod extension secured to the push rod and guided by and passing through the boring bar, means connecting said machining tool holder and said push rod extension and normally lying within a recess of the boring bar, a spring within the bore of said adapter member serving to yieldingly resist movement of the push rod within the bushing, a thrust bearing encircling the aforesaid hub and bearing on one face against said guide collar, a thrust ring encircling the aforesaid bushing and bearing against the other face of the thrust bearing, and an adjusting ring encircling said bushing and having a screw-threaded engagement therewith, said adjusting ring bearing against said thrust ring.

2. A spherical boring head comprising a guide member, an adapter member, a bushing formed at one end for a close running fit within a reduced bore of said guide member, the other end of the bushing being received within a bore of the adapter member, means to prevent relative rotation between said bushing and said adapter member, a boring bar carried by the bushing and secured against translation and rotation with respect thereto, a machining tool holder pivotally carried by the boring bar and normally lying within a recess thereof, a push rod mounted for longitudinal movement within the bushing and attached to the adapter member and having an extension guided by and passing through the boring bar, means connecting said machining tool holder and said push rod extension and normally lying within a recess of the boring bar, means serving to yieldingly resist movement of the push rod within the bushing, and means to adjust the relative longitudinal positions of the guide member and the bushing.

3. A spherical boring head comprising a guide member, an adapter member, a connecting member formed at one end for a close running fit within a bore of said guide member, the other end of the connecting member being received within a bore of the adapter member, said connecting member having a longitudinal bore, means to prevent relative rotation between said connecting member and said adapter member, a boring bar carried by the connecting member and secured against translation and rotation with respect thereto, a machining tool holder pivotally carried by the boring bar and normally lying within a recess thereof, an actuator rod mounted for longitudinal movement in the bore of the connecting member and attached to the adapter member and passing through the boring bar, means connecting said machining tool holder and said actuator rod and normally lying within a recess of the boring bar, means serving to yieldingly resist movement of the actuator rod within the connecting member, and means to adjust the relative longitudinal positions of the guide member and the connecting member.

4. A spherical boring head comprising a guide collar, an adapter member, a hub with a reduced bore associated with said guide collar, an elongated bushing formed at one end for a close running fit within the reduced bore of said hub, the other end of the bushing being received within a bore of the adapter member, means to retain the ne end of the bushing within the bore of the hub, means to retain the other end of the bushing within the bore of the adapter member, means to prevent relative rotation between said bushing and said adapter member, a boring bar carried by the bushing and secured against translation and rotation with respect thereto, a machining tool holder pivotally carried by the boring bar and normally lying within a recess thereof, a push rod mounted for longitudinal movement within the bushing and attached to the adapter member, a push rod extension secured to the push rod and guided by and passing through the boring bar, means connecting said machining tool holder and said push rod extension and normally lying within a recess of the boring bar, a coiled spring within the bore of said adapter member serving to yieldingly resist movement of the push rod within the bushing, a thrust bearing encircling the aforesaid hub and bearing on one face against said guide collar, a thrust ring encircling the aforesaid bushing and bearing against the other face of the thrust bearing, and an adjusting ring encircling said bushing and having a screw-threaded engagement therewith, said adjusting ring bearing against said thrust ring.

ANTON ROTHSCHMITT.